United States Patent [19]

Cogo

[11] Patent Number: 4,546,870

[45] Date of Patent: Oct. 15, 1985

[54] DEVICE FOR TRANSPORTING AND POSITIONING DOUGH TRIANGLES IN CRESCENT SHAPED DOUGH ROLLS FORMING MACHINES

[76] Inventor: Bruno Cogo, Via G. Pascoli, 14, Selvazzano Dentro (Province of Padova), Italy

[21] Appl. No.: 463,363

[22] Filed: Feb. 3, 1983

[30] Foreign Application Priority Data

Feb. 12, 1982 [IT] Italy ................ 41519 A/82

[51] Int. Cl.⁴ .......................................... B65G 47/24
[52] U.S. Cl. ................................... 198/400; 198/447
[58] Field of Search .............. 198/400, 374, 831, 839, 198/951, 447, 448, 457

[56] References Cited

U.S. PATENT DOCUMENTS

| | | | |
|---|---|---|---|
| 1,698,786 | 1/1929 | Finn | 198/831 X |
| 4,119,194 | 10/1978 | Freeman et al. | 198/400 |
| 4,121,403 | 10/1978 | Bogdanski et al. | 198/400 X |

FOREIGN PATENT DOCUMENTS 520826  3/1931  Fed. Rep. of Germany ...... 198/839

Primary Examiner—Joseph E. Valenza
Assistant Examiner—Jonathan D. Holmes
Attorney, Agent, or Firm—Guido Modiano; Albert Josif

[57] ABSTRACT

The device forms an operative station located downstream of the machine which cuts out dough triangles for the production of crescent shaped rolls of dough.

Through the use of parallel conveyors across the direction of advance of the cut dough, which are continued in tracks through a 180° arc, it becomes possible to realign the dough cut into triangles with the same orientation without turning the triangles upside down.

2 Claims, 6 Drawing Figures

DEVICE FOR TRANSPORTING AND POSITIONING DOUGH TRIANGLES IN CRESCENT SHAPED DOUGH ROLLS FORMING MACHINES

BACKGROUND OF THE INVENTION

This invention relates to a device for transporting and positioning dough triangles in crescent shaped dough rolls forming machines.

The technique for preparing crescents, also called "croissants", consists in preparing a strip of dough which is rolled on a roller machine.

After some dough strip calibration operations, the strip is transferred into a machine which cuts out triangles.

In order to waste no materials and reduce costs, the triangles are arranged, after the cutting thereof, in parallel rows with opposing orientations, as shown in FIG. 1.

After cutting, the triangles or at least one half of them must be orientated such that they are all presented to the rolling machine with their bases onwards.

On commercially available machines, these orientation operations are carried out by simply turning upside down alternately one half of the triangles, as shown diagramatically in FIG. 2.

The triangles will then enter the rolling machine which comprises essentially a main roller A which carries the dough triangle 2, an upper roller B which guides the dough triangle 1, and two roll-up belts C and D which perform the rolling operation with the aid of the roller A (FIG. 3).

The problem encountered with this processing originates from the fact that the dough, upstream of the cutting station, is located on a continuous conveyor belt, thereby the top face, being exposed to air, is drier than the bottom face which bears onto the belt and is thus prevented from losing moisture.

This position is also satisfactory on the roll-up machine, because the wetter face will adhere on the roller A which transfers it onto the roll-up belts C and D without problems, since a weak adhesion engagement is established between the dough and roller B.

However, when the triangles 1 which have been upturned arrive, the higher adhesion due to higher moisture will occur on the roller B, so that the dough triangle 1 readily separates from the roller A and is not inserted in between the roll-up belts C and D and is instead ejected, as shown in dotted lines in FIG. 3.

This situation produces considerable inconvenience, accompanied by a reduced output, and requires constant attention by an operator for recovering the high number of dough triangles which are not processed.

SUMMARY OF THE INVENTION

It is an object of this invention to remove the drawbacks exhibited by the machines currently in use.

A consequent object of the invention is to provide a device which allows the dough triangles to be taken to the rolling machine all oriented and arranged in the same position.

A further object is to provide a device which enables this orientation to be carried out without the dough triangles being overturned with respect to the position which they occupied on the conveyer belt prior to cutting.

A not unimportant object is to provide a simple and automatic device.

These and other objects, such as will be apparent hereinafter, are achieved by a device arranged in a crescent shaped dough rolls forming machine, wherein dough triangles are arrayed on cutting station leaving conveyor means in at least two rows of triangles with vertices pointing in opposite directions and are transported from said cutting station leaving conveyor means to a rolling station supplying conveyor, a device arranged between said cutting station leaving conveyor means and said rolling station supplying conveyor, characterized in that the device comprises at least two intermediate conveyor means operated with opposite conveying directions for receiving each one of said oppositely pointing triangle rows, each of said intermediate conveyor means having oppositely arranged exit ends where the dough triangles leave the conveyor means, means defining an arcuated conveyor path at each of said exit ends of the intermediate conveyor means, said arcuated conveyor paths converging towards said rolling station supplying conveyor to deliver thereon at least two juxtaposed rows of equaly pointing triangles rows.

BRIEF DESCRIPTION OF THE DRAWINGS

Further features and advantages of the invention wil be more apparent from the following detailed description of a preferred embodiment, given herein by way of example and not of limitation and illustrated in the accompanying drawings, where.

DESCRIPTION OF THE PREFERRED EMBODIMENT

Figure 1:
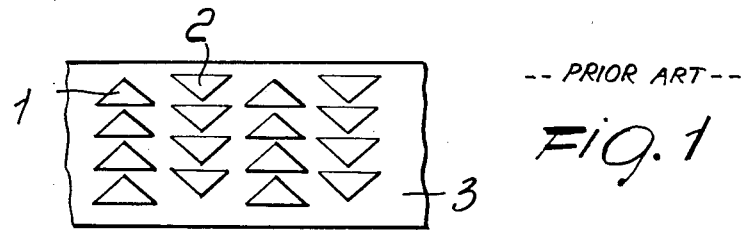
FIG. 1 shows a series of dough triangles as they appear upon leaving the per se known cutting station.
Figure 2:
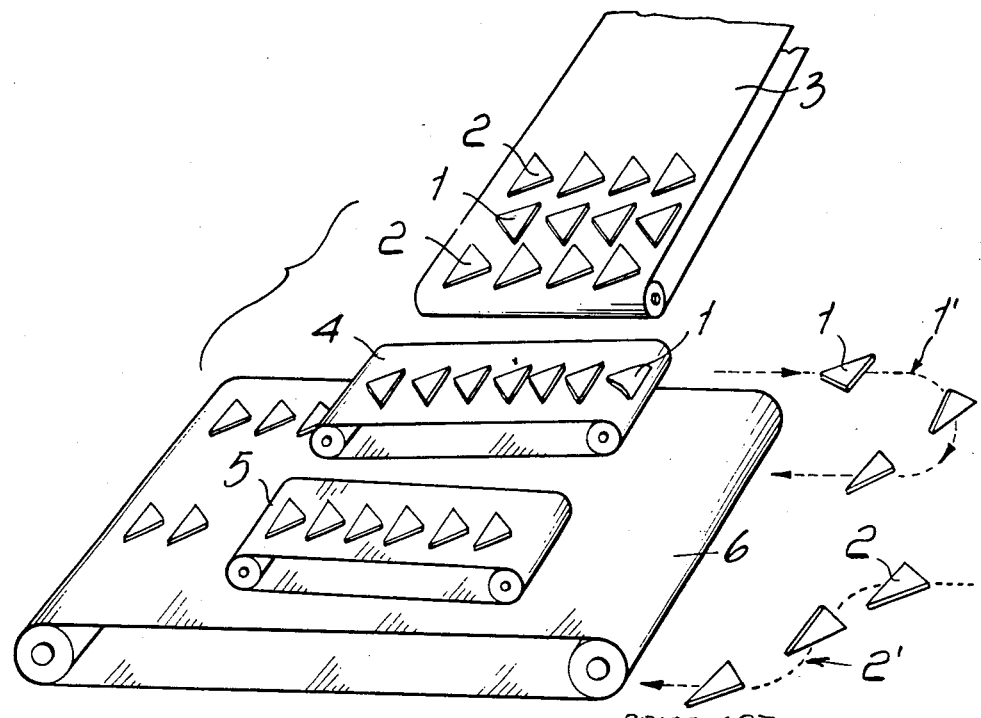
FIG. 2 is a diagram of how the reversal of the product takes place according to the prior art.
Figure 3:
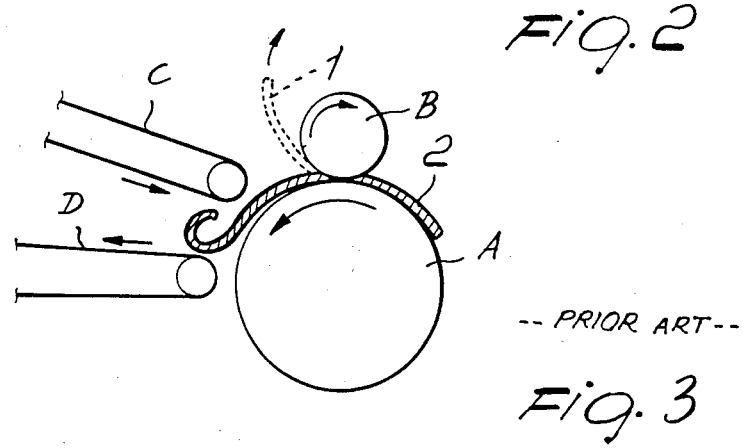
FIG. 3 shows diagramatically a per se known triangle rolling machine.

FIGS. 1, 2 and 3 shown some main component parts of a known machine, which may be of the type manufactured by the Italian Firm Tecknomatik S.n.c. of 35030 Selvazzano Dentro (Padova) Italy and illustrated in the catalogue of the firm.

Since these component parts are well known at least from the above identified machine, the details thereof are not further described.

With reference to the drawing figures, and as already explained in introducing the prior art, the dough is cut into triangles indicated at 1 and 2, being identifiable by the opposite orientation of the arrayed vertices caused to advance and spread apart on a belt 3.

Said belt 3 alternately feeds two cross belts 4 and 5 which are driven in opposite directions and overlie a wide belt 6 moving toward the rolling machine, not shown. The triangles of the type 1 are dropped from the belt 4 onto the belt 6 through the stage 1' shown like stage 2' in an enlarged scale in a dislocated position for the sake of clarity which, as may be noted, involves turning of the product upside down, whereas the triangles of the type 2 are dropped onto the belt 6 according to the stage 2', i.e. without being turned upside down.

The triangles 1 are turned upside down owing to the fact that the direction of motion of belt 4 is opposite to the one of belt 6, so that at the moment in which a triangle 1 falls edge on onto the belt 6 the inertial forces and the drag of belt 6 cause the turning upside down. Since in case of belt 5 the inertial forces and the drag of belt 6 act in the same direction, no overturning occurs.

Figure 4:
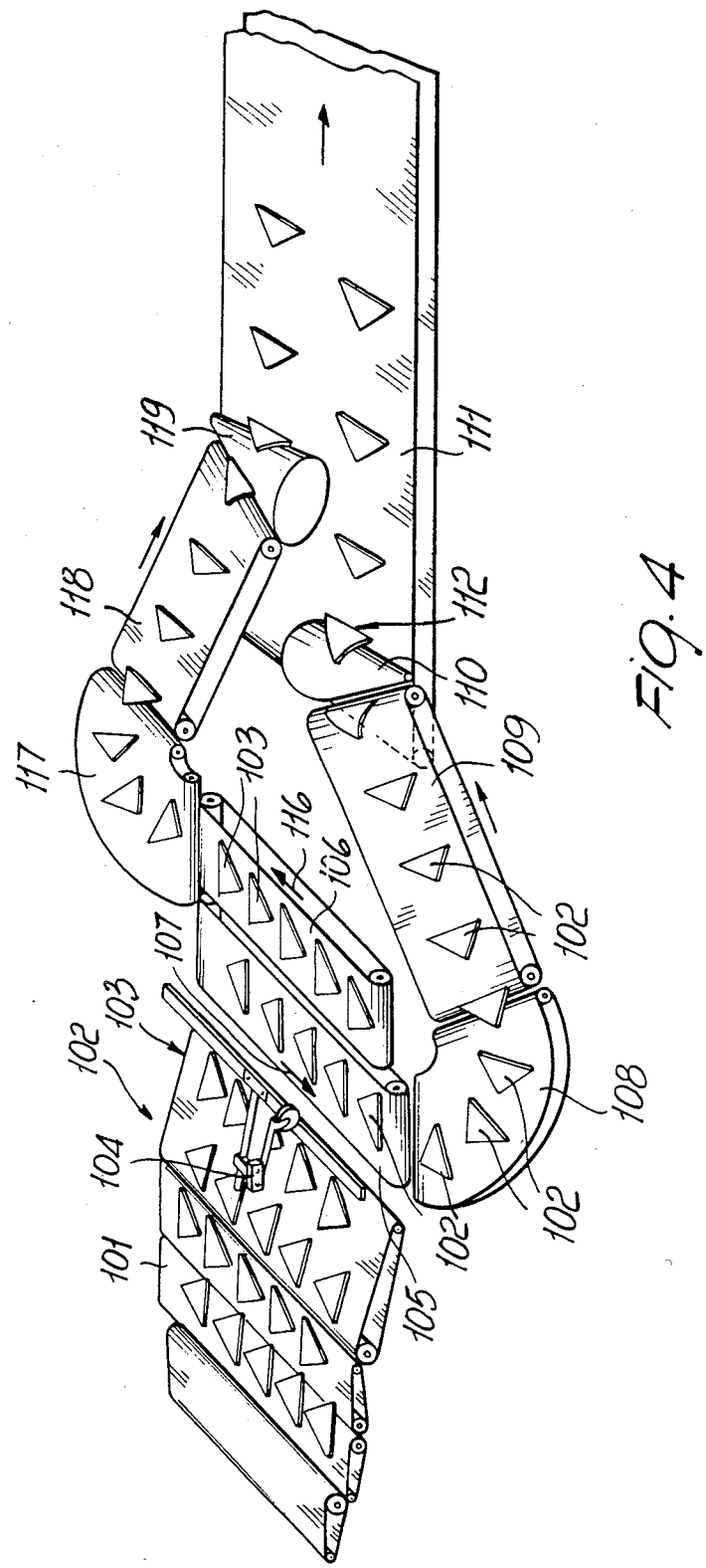
FIG. 4 is a perspective view of the inventive device.
Figure 5:
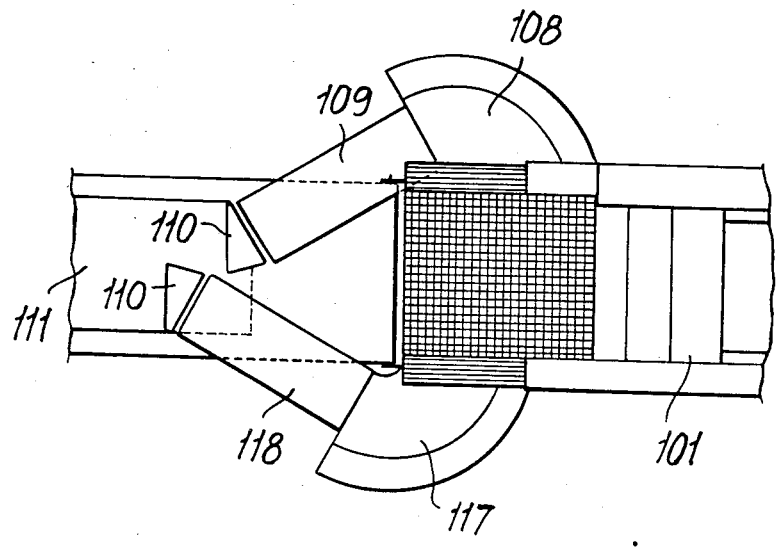
FIG. 5 is a plan view of the device according to the invention.
Figure 6:
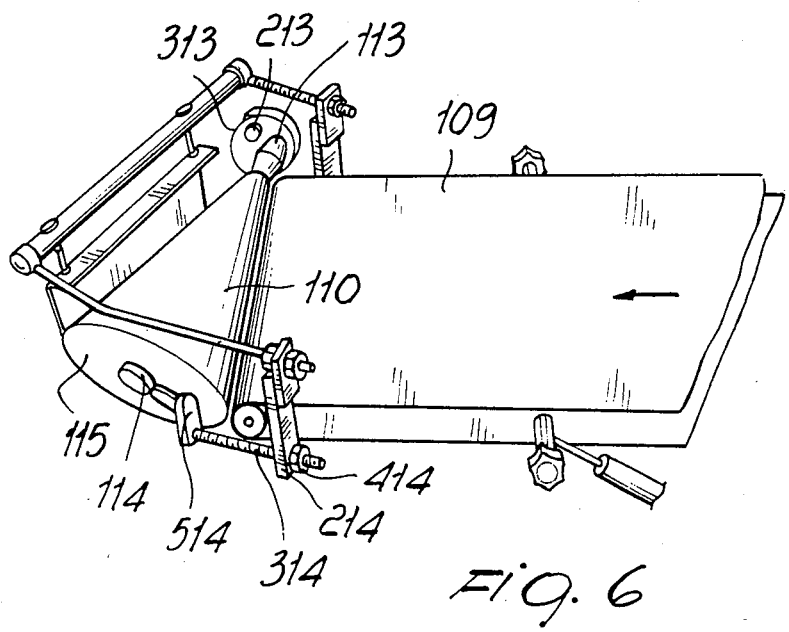
FIG. 6 is a detail view of the device.

In the inventive device (FIGS. 4–6), a conveyor belt 101 causes the cut off triangles to advance, now indicated at 102 with vertex arrayed in one direction, and at 103 with vertex arrayed in the opposite direction. A device 104, of conventional design and already provided in ordinary machines e.g. the above identified one, transfers the rows of triangles 102 and 103 onto two parallel cross belts 105 and 106, respectively.

The belt 105, driven in the direction of the arrow 107, only receives triangles of the 102 type, and moves them to an arched conveyor 108 which causes the triangles 102 to perform a planar rotational movement through an angle of about 120°.

Arched conveyors are well known in the art so that the same are not described here more in detail, it being sufficient to mention that the belt member of the conveyor is made of usual flexible material having the shape of the periphery of a flattened truncated cone.

A successive rectilinear belt 109 located downstream of the former, transports the dough triangles 102 to a first cone 110 or series of cones, which rotates the triangles so as to drop them onto a common conveyor belt 111 with the base 112 lying orthogonally to the mid-axis of the belt 111.

That arrangement is made necessary in order to have the belt 111 bring the triangles to a rolling machine of the type shown schematically in FIG. 3, with one base parallel to the external surface of the cylinder indicated at A.

In order to control or correct the position of the base 112 of the triangle such that it is exactly perpendicular to the mid-axis, and accordingly to the direction of advance of the belt 111, the cone 110 is supported at the vertex by means of a bearing support 113 independently from a second support 114, also of the bearing type, located at the center of the base 115 of the cone 110.

It should be noted that the support 113 is part of a transmission gearing through which rotation is transmitted to the cone 110. Only a gear 213 and the casing 313 of the transmission gearing is diagrammatically shown. Gear 213 is in mash with a ring gear provided on the support shaft 113 of the cone. The transmission gearing 313 is supported in an adjustable manner, allowing angular and translatory adjustments by lever and screw mechanisms not shown, similar to those hereinafter described in connection with support 114. Support 114 is supported by a fixed upright 214 having an elongated hole (not shown) through which a threaded rod 314 is passed, fixed on the upright 214 by means of screw nuts 414. On the end of rod 314 opposite to the upright 214 an elbow shaped lever 514 is fixed on which the support proper 114 is supported. Upon unloosing the screws nuts 414, rod 314 may be shifted upwards within the vertically elongated hole provided in the upright 214 in which the screw nuts 414 and rod 314 are seated and the support 114 may be adjusted in height such that the axis of the cone 110 can be rotated about the support 113. This enables the triangle being transported on the belt 104 to be intercepted on a desired generatrix and moved through a more or less wide angle prior to discharging it onto the belt 111, so that the base of the triangle is arranged precisely along a perpendicular to the axis of the belt 111.

By rotating the threaded rod 314 about its axis and maintaining the screw nuts 414 fixed, the rod 314 together with the support 114 may be horizontally shifted to adjust the spacing between the cone 110 and conveyor 109.

The triangles of the type 103 are discharged on said belt 106, which moves in the direction of the arrow 116, oppositely to the belt 107.

Said belt 106 takes the triangles 103 to a second angled conveyor 117, similar to conveyor 108, and hence to a rectilinear conveyor belt 118 which with the aid of an additional cone 119 transports the triangles to the belt 111, still with the base oriented and arranged along a perpendicular to the axis of the belt 111.

As may be seen, the triangles of the types 102 and 103 which are laid on the belt 101 with reversed bases and vertices, are arranged equi-oriented and side-by-side on the belt 111, having being re-oriented by rotation on a plane and not by overturning.

That being the manner in which the device operates, the dough triangles always maintain, through any transportation phase, one and the same face in contact with the conveyor belt, so that no situations can be originated of different or anomalous adhesion during the rolling up step, which brings about a reduced labor input for controlling the correct arrangement of the triangles fed into the rolling machine.

In practice, the invention affords the possibility of letting the triangle roll-up machine to always work in the same position, thus avoiding any waste problems due to the triangles taking unwanted orientations in the rolling machine.

The advantages of this device will be readily appreciated, as is apparent the technical problem which has been solved thereby.

Of course, based on the same inventive concept which consists of rotating a certain element while keeping it coplanar throughout and without overturning it, through the use of flat conveyor belts, the invention may be embodied differently without departing from the scope thereof.

The materials and dimensions may be any suitable ones to meet individual requirements.

I claim:

1. In a crescent shaped dough rolls forming machine, wherein dough triangles are arrayed on cutting station leaving conveyor means in at least two rows of triangles with vertices pointing in opposite directions and are transported from said cutting station leaving conveyor means to a rolling station supplying conveyor, a device arranged between said cutting station leaving conveyor means and said rolling station supplying conveyor, comprising at least two intermediate conveyor means operated with opposite conveying directions for receiving each one of said oppositely pointing triangles rows, each of said intermediate conveyor means having oppositely arrange exit ends where the dough triangles leave the conveyor means, means defining an arcuated conveyor path at each of said exit ends of the intermediate conveyor means, said arcuated conveyor paths converging towards said rolling station supplying conveyor to deliver thereon at least two juxtaposed rows of equally pointing triangle rows, and wherein said intermediate conveyor means are part of said arcuated conveyor paths, each of said arcuated conveyor paths having downstream of said intermediate conveyor means an arcuated conveyor and downstream therefrom a rectilinear conveyor directed towards said rolling station supplying conveyor, said arcuated conveyor paths being symmetrically arranged with respect to the axis of said rolling station supplying conveyor, and wherein the device further comprises a transfer cone at the downstream end of said rectilinear conveyor to peform transfer of said dough triangles from said arcuated conveyor to said rectilinear conveyor, means adjustably supporting said transfer cone.

2. A device according to claim 1, characterized in that said means for adjustably supporting said transfer cone comprise adjustment means for raising and lowering one end of said transfer cone, thereby to adjust the inclination thereof with respect to said rectilinear conveyor means.

* * * * *